United States Patent
Ohno et al.

(10) Patent No.: US 12,013,586 B2
(45) Date of Patent: Jun. 18, 2024

(54) OPTICAL FIBER CABLE

(71) Applicant: Fujikura Ltd., Tokyo (JP)

(72) Inventors: Masatoshi Ohno, Sakura (JP); Akira Namazue, Sakura (JP); Ken Osato, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 17/925,400

(22) PCT Filed: Feb. 16, 2021

(86) PCT No.: PCT/JP2021/005686
§ 371 (c)(1),
(2) Date: Nov. 15, 2022

(87) PCT Pub. No.: WO2021/229880
PCT Pub. Date: Nov. 18, 2021

(65) Prior Publication Data
US 2023/0185049 A1    Jun. 15, 2023

(30) Foreign Application Priority Data
May 15, 2020   (JP) ................................. 2020-085734

(51) Int. Cl.
G02B 6/46    (2006.01)
G02B 6/44    (2006.01)

(52) U.S. Cl.
CPC ........... *G02B 6/566* (2023.05); *G02B 6/4429* (2013.01)

(58) Field of Classification Search
CPC ..... G02B 6/4497; G02B 6/4429; G02B 6/566

USPC ......................................................... 385/113
See application file for complete search history.

(56) References Cited

U.S. PATENT DOCUMENTS

| | | | |
|---|---|---|---|
| 5,173,961 A * | 12/1992 | Chiasson | G02B 6/4495 385/112 |
| 5,642,452 A | 6/1997 | Gravely et al. | |
| 6,563,991 B1 * | 5/2003 | Witt | G02B 6/4495 385/107 |
| 9,201,208 B2 * | 12/2015 | Gimblet | G02B 6/46 |
| 9,482,839 B2 * | 11/2016 | Sandate Aguilar | G02B 6/4434 |

(Continued)

FOREIGN PATENT DOCUMENTS

| | | |
|---|---|---|
| CN | 109814219 A | 5/2019 |
| JP | 2012-155230 A | 8/2012 |

(Continued)

OTHER PUBLICATIONS

International Search Report issued in corresponding International Application No. PCT/JP2021/005686 mailed May 18, 2021 (4 pages).

*Primary Examiner* — Jerry M Blevins
(74) *Attorney, Agent, or Firm* — Osha Bergman Watanabe & Burton LLP

(57) ABSTRACT

An optical fiber cable includes: a cable body that includes an optical fiber; an external sheath that accommodates the cable body; a protective layer that is disposed between the cable body and the external sheath and that includes a first groove on an inner circumferential surface of the protective layer, wherein the first groove extends along an axial direction of the cable body; and a first ripcord disposed in the first groove and between the cable body and the protective layer.

7 Claims, 8 Drawing Sheets

(56) References Cited

U.S. PATENT DOCUMENTS

| | | | |
|---|---|---|---|
| 2003/0118295 A1* | 6/2003 | Lail | G02B 6/447 |
| | | | 385/100 |
| 2009/0317039 A1* | 12/2009 | Blazer | G02B 6/4495 |
| | | | 385/107 |
| 2012/0051702 A1 | 3/2012 | Blazer et al. | |
| 2013/0129290 A1* | 5/2013 | Keller | G02B 6/441 |
| | | | 385/112 |
| 2017/0343752 A1 | 11/2017 | Ji et al. | |
| 2018/0106977 A1 | 4/2018 | Ohno et al. | |
| 2018/0136423 A1* | 5/2018 | Takeda | G02B 6/44 |

FOREIGN PATENT DOCUMENTS

| | | |
|---|---|---|
| JP | 2014-119635 A | 6/2014 |
| JP | 2016-206350 A | 12/2016 |
| JP | 2017-072801 A | 4/2017 |
| JP | 2019-113617 A | 7/2019 |
| JP | 2019-113619 A | 7/2019 |

* cited by examiner

OPTICAL FIBER CABLE

CROSS-REFERENCE TO RELATED APPLICATIONS

The present application claims priority from Japanese Patent Application No. 2020-085734 filed in Japan on May 15, 2020, the contents of which are incorporated herein by reference in their entirety.

BACKGROUND

Technical Field

The present invention relates to an optical fiber cable.

Description of the Related Art

An optical fiber cable includes a cable body, a tubular external sheath accommodating the cable body, a metallic reinforcing sheet provided between the cable body and the external sheath, and a ripcord disposed between the reinforcing sheet and the cable body (for example, see patent document 1). When the cable body is taken out from optical fiber cable, the cable body is taken out by tearing the reinforcing sheet and the external sheath with the ripcord.

PATENT DOCUMENT

Patent document 1: JP2017-72801A

However, in the optical fiber cable as described above, there is a gap between the cable body and the reinforcing sheet. Therefore, when the external sheath is torn with the ripcord, workability may be deteriorated because the ripcord is moved in the circumferential direction.

SUMMARY

One or more embodiments may provide an optical fiber cable capable of improving workability by restraining the movement of the ripcord.

[1] An optical fiber cable comprises: a cable body that includes an optical fiber; an external sheath that accommodates the cable body; a protective layer that is disposed between the cable body and the external sheath; and a ripcord that is disposed between the cable body and the protective layer. The protective layer includes a groove that is formed on an inner circumferential surface of the protective layer and extends along an axial direction of the cable body. The ripcord is disposed in the groove.

[2] In one or more embodiments, the protective layer may have a corrugated shape that includes peaks and valleys alternately disposed along the axial direction of the cable body. The groove may include recesses that are formed by recessing a portion of the peaks. The recesses may be disposed along the axial direction of the cable body. The ripcord may be disposed in the recesses.

[3] In one or more embodiments, the ripcord may include a first ripcord and a second ripcord, the groove may include a first groove and a second groove, the first ripcord may be disposed in the first groove, and the second ripcord may be disposed in the second groove.

[4] In one or more embodiments, the optical fiber cable may satisfy a formula (1) below;

$$\theta_1 \geq 120° \tag{1}$$

in the formula (1), $\theta_1$ is an angle between a first straight line and a second straight line, the first straight line is a straight line that passes through a center of the cable body and a center of the first ripcord, and the second straight line is a straight line that passes through the center of the cable body and a center of the second ripcord.

[5] In one or more embodiments, the optical fiber cable may further comprise: at least a pair of tensile strength members embedded in the external sheath and facing each other across the cable body. The protective layer may include an overlapping portion formed by overlapping the both ends in a circumferential direction of the cable body, and the optical fiber cable may satisfy a formula (2) below;

$$\theta_2 \leq 70° \tag{2}$$

in the formula (2), $\theta_2$ is a larger angle of angles between a third straight line and a fourth straight line and an angle between the third straight line and a fifth straight line, the third straight line is a neutral line defined by the tensile strength members, the fourth straight line is a straight line that passes through a center of the cable body and a first end of the overlapping portion, and the fifth straight line is a straight line that passes through the center of the cable body and a second end of the overlapping portion.

[6] In one or more embodiments, the optical fiber cable may further comprise; a film that is attached to a inner surface of the protective layer to cover the tearing string. The ripcord may be disposed between the film and the groove.

[7] In one or more embodiments, the optical cable may satisfy a formula (3) below;

$$d_1/D \geq \frac{1}{2} \tag{3}$$

in the formula (3), $d_1$ is a depth of the groove, and D is a diameter of the ripcord.

[8] In one or more embodiments, the protective layer may have a tubular shape around the cable body.

An optical fiber cable according to one or more embodiments can improve the workability by restraining the movement of the ripcord in the circumferential direction with the grooves formed on the inner surface of the protection layer.

DESCRIPTION OF THE EMBODIMENTS

Hereinafter, embodiments of the present invention will be described with reference to the drawings.

First Example

Figure 1:
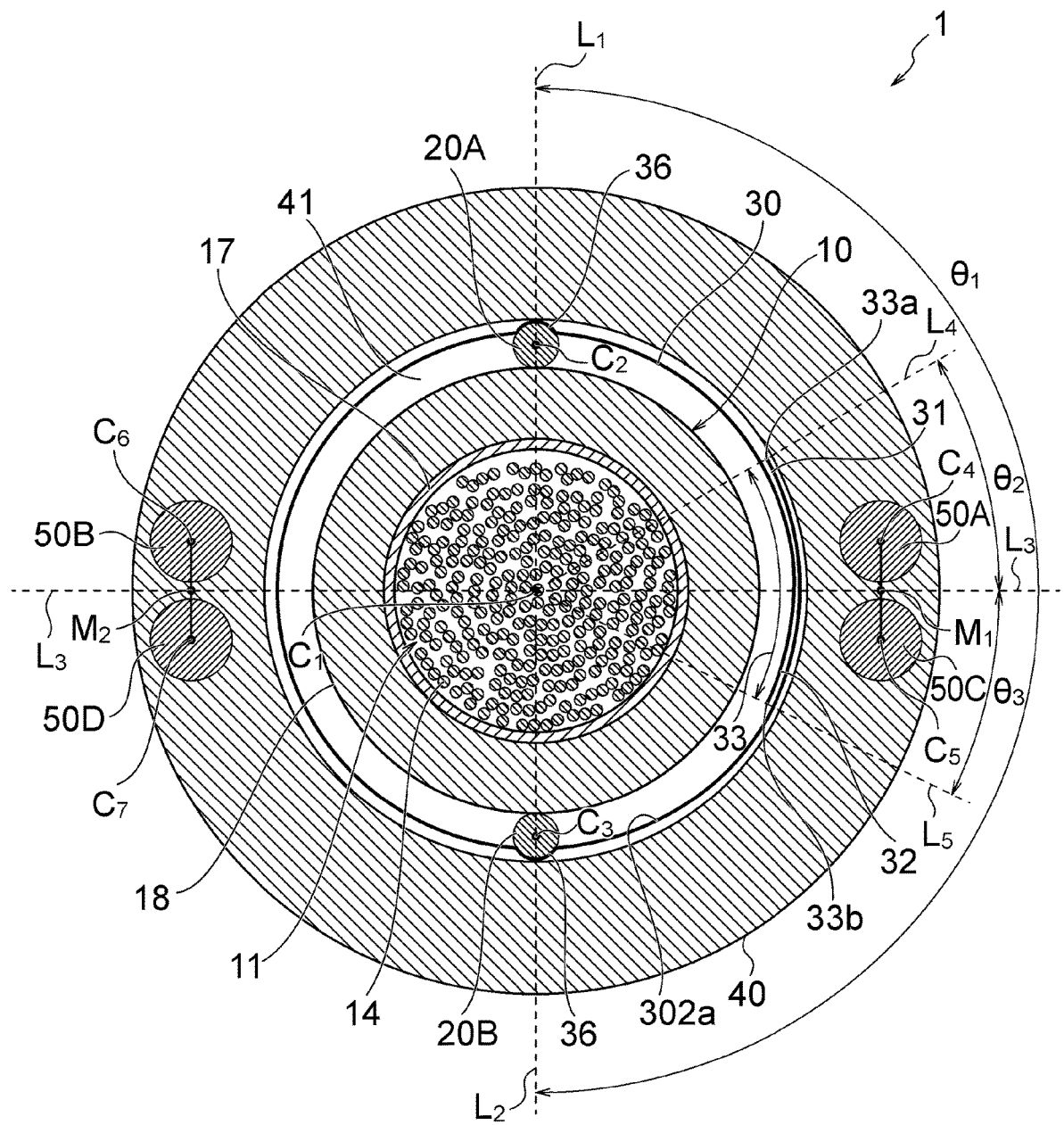
FIG. 1 is a cross-sectional view showing an optical fiber cable in one or more embodiments.
Figure 2:
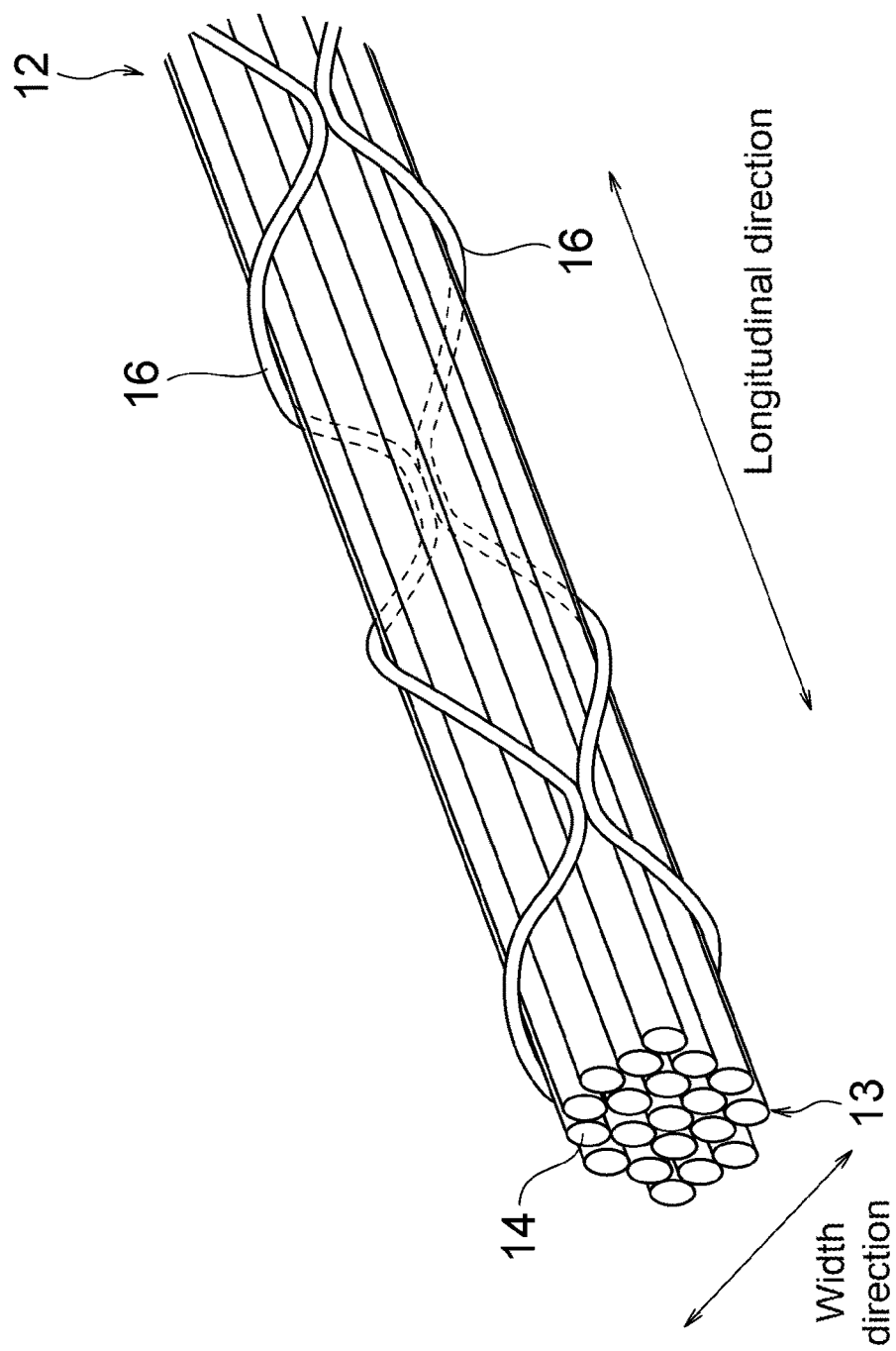
FIG. 2 is a perspective view showing an optical fiber unit in one or more embodiments.
Figure 3:
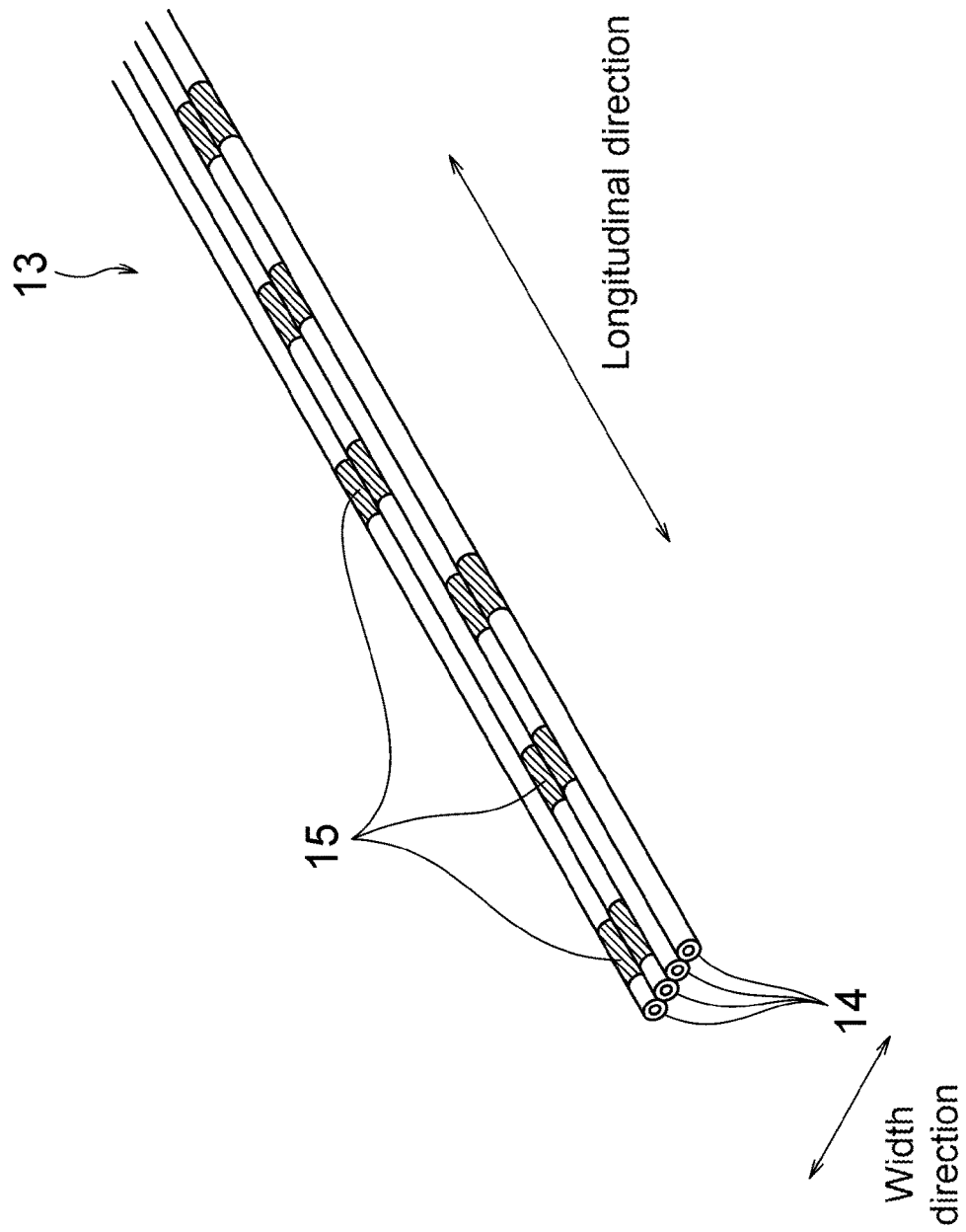
FIG. 3 is a perspective view showing an optical fiber ribbon of an intermittent fixing type in one or more embodiments.

FIG. 1 is a cross-sectional view showing an optical fiber cable in one or more embodiments. FIG. 2 is a perspective view showing the optical fiber unit in one or more embodiments. FIG. 3 is a perspective view showing the optical fiber ribbon of an intermittent fixing type in one or more embodiments.

As shown in FIG. 1, the optical fiber cable 1 comprises a cable body 10, ripcords 20A, 20B, a protection layer 30, an external sheath 40, and tensile strength members 50A to 50D.

The cable body 10 in one or more embodiments comprises a optical fiber assembly 11, a press-wrapping tape 17, and an inner sheath 18.

The optical fiber assembly 11 is an assembly obtained by assembling a plurality of optical fibers 14. Specifically, in one or more embodiments, the optical fiber assembly 11 is formed by bundling a plurality of optical fiber units 12. Furthermore, as shown in FIG. 2, each of the optical fiber unit 12 comprises optical fiber ribbons 13, and a bundle materials 16.

As shown in FIG. 3, each of the optical fiber ribbon 13 is an optical fiber tape of the intermittent adhesive type formed by intermittently connecting a plurality (in this example four) of the optical fibers (optical fiber strands) 14 in parallel. Specifically, the optical fibers 14 adjacent to each other are bonded intermittently on the adhesive portion 15 at predetermined intervals. The adhesive portion 15 is formed of, for example, an ultraviolet curable resin or a thermoplastic resin. The adhesive portions 15 are arranged to be displaced from each other with respect to the longitudinal direction of the optical fiber ribbon 13. Furthermore, the region other than the adhesive portion 15 in the optical fiber ribbon 13 is a non-adhesive region where the optical fibers 14 are not restrained each other. Therefore, since the optical fiber ribbon 13 can be folded or rounded into the cylindrical shape (a bundle shape), it is possible to bundle a large number of optical fibers 14 in high density.

As shown in FIG. 2, the optical fiber unit 12 is composed of the optical fiber ribbons 13 bundled by the bundle members 16. The bundle member 16 is a member wound in a mesh shape on the outer periphery of the bundle of the optical fiber ribbons 13. Although not particularly shown, as the bundle material 16, a string-shaped member wound helically on the outer periphery of the bundle of the optical fiber ribbon 13 may be used.

Then, as shown in FIG. 1, the optical fiber assembly 11 is formed by twisting optical fiber units 12 together. Specific examples of the twisting method of the optical fiber unit 12 may include SZ twisting or unidirectional twisting. The SZ twisting is a twisting method for twisting linear bodies while inverting the twisting direction at predetermined intervals. The unidirectional twisting is a twisting method for twisting linear bodies whose the twisting direction is only one direction, that is, a twisting method for twisting linear bodies in a spiral shape.

The configuration of the optical fiber ribbon 13 is not limited to the above. For example, the optical fiber 14 is not intermittently bonded, the entire optical fibers 14 may be bonded to each other. The configuration of the optical fiber unit 12 is not particularly limited to the above configuration. For example, the optical fiber units 12 may be formed only by bundling optical fibers 14 without using the optical fiber ribbons 13. The configuration of optical fiber assembly 11 is not particularly limited to the above-described configuration. For example, the optical fiber assembly 11 may be formed only by twisting optical fibers 14 without using the optical fiber units 12. Further, the optical fiber assembly 11 may be constituted by a loose tube accommodating the optical fibers.

The optical fiber ribbon is covered around by the press-wrapping tape 17. In one or more embodiments, the press-wrapping tape 17 is wound on the outer periphery of optical fiber assembly 11 in longitudinal direction so that the longitudinal direction of the press-wrapping tape 17 substantially coincides with the axial direction of the optical fiber cable 1 and the width direction of the press-wrapping tape 17 substantially coincides with the circumferential direction of the optical fiber cable 1. Since the winding method of the press-wrapping tape 17 is the longitudinal lapping, workability of the take-out operation of the optical fiber 14 from the optical fiber cable 1 is improved. The winding method of the press-wrapping tape 17 is not limited to the longitudinal lapping, for example, may be a spiral winding.

This press-wrapping tape 17 is made of a nonwoven fabric or a film. Specific examples of the nonwoven fabric constituting the press-wrapping tape 17 are not particularly limited, and a nonwoven fabric made of fibers such as polyester, polyethylene, and polypropylene is exemplified. Specific examples of the film constituting the press-wrapping tape 17 are not particularly limited, and a film made of a resin such as polyethylene (PE), polypropylene (PP), polyethylene terephthalate (PET), polybutylene terephthalate (PBT), or nylon is exemplified.

The inner sheath 18 is a tubular member covering the outer periphery of the press-wrapping tape 17, the optical fiber assembly 11 wrapped in the holding tape 17 is accommodated in the inner sheath 18. This inner sheath 18 is made of a resin material such as polyvinyl chloride (PVC), polyethylene (PE), nylon, ethylene fluoride, or polypropylene (PP)

The structure of cable body 10 is not particularly limited to the above, for example, may be a cable of a slot structure, a loose tube structure, or a slot-less structure. The outer shape of the cable body 10 is not particularly limited. For example, the outer shape of the cable body 10 may be round, flat, irregular, or irregular. Further, in one or more embodiments has exemplified a center tube structure comprising an inner sheath 18 is not particularly limited to the above, the inner sheath 18 may be omitted from an optical fiber assembly 11. That is, the cable body 10 may comprise at least one optical fiber.

A pair of the ripcords 20A, 20B is a string-shaped member for taking out the optical fiber 14 by tearing the protection layer 30 and the external sheath 40 at the middle portion of the optical fiber cable 1. The ripcords 20A, 20B are arranged to extend across the cable body 10 in substantially parallel. In the case a tensile strength member (tensile strength members 50A~50D described below) is disposed in the external sheath 40, the ripcords are opposed to each other along a direction substantially perpendicular to the opposing direction of the tensile strength members 50A~50D. In one or more embodiments, since the ripcords 20A, 20B do not overlap with the tensile strength member 50A~50B, it is possible to further improve the tearing workability.

The ripcords 20A, 20B are not particularly limited to, but are made of, for example, a twisted yarn made of polyester, or a fiber string-like body such as aramid fiber or glass fiber. The outer diameter of the ripcords 20A, 20B may be, for example, 0.2 mm to 1.0 mm.

Figure 4A:
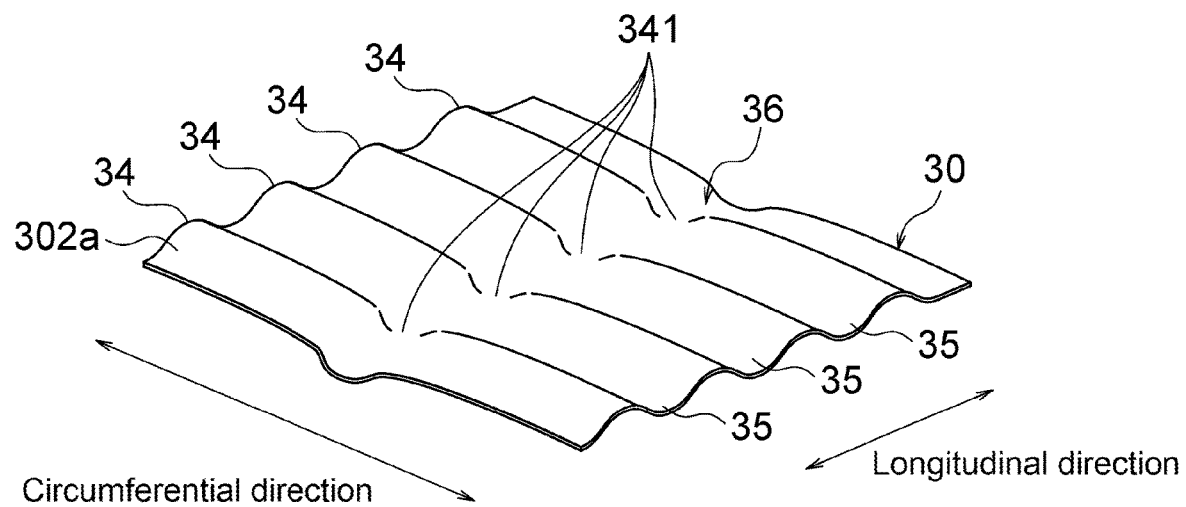
FIG. 4A is an exploded view of a protection layer shown in FIG. 1.
Figure 4B:
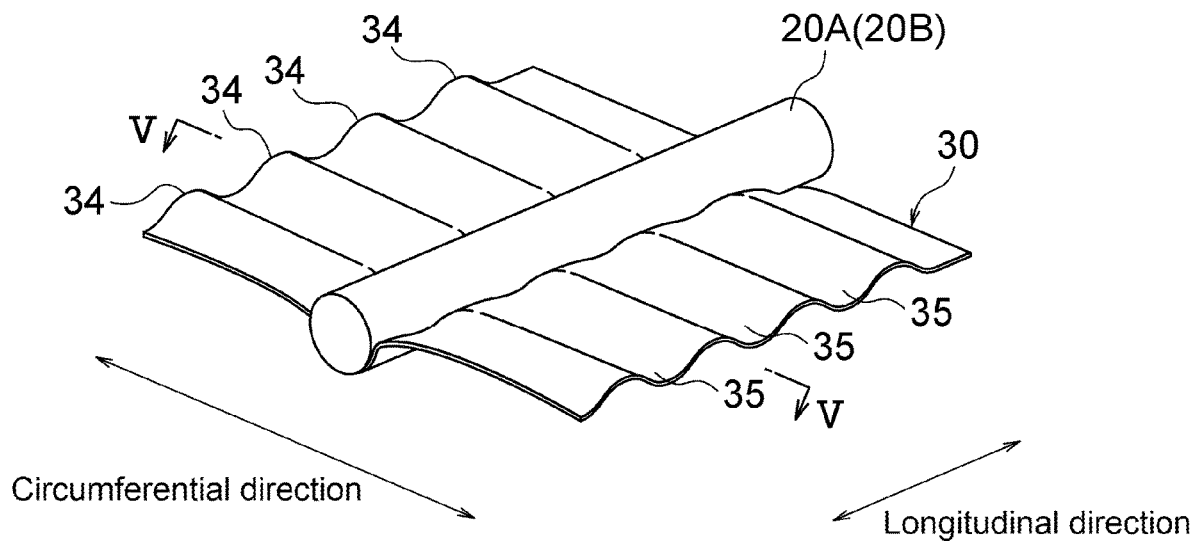
FIG. 4B is an exploded view of a state in which ripcords are disposed in recesses of a protection layer of FIG. 4A.

FIG. 4A is an exploded view of the protection layer 30 shown in FIG. 1. FIG. 4B is an exploded view of a state in which the ripcords are disposed in recesses of the protection layer of FIG. 4A. Further, FIG. 5 is a cross-sectional view taken along the line V-V of FIG. 4B.

As shown in FIGS. 1, 4A, and 4B, the protection layer 30 covers the cable body 10 and the ripcords 20A, 20B. This protection layer 30 is provided to protect the cable body 10. The protection layer 30 prevents the cable body 10 from being damaged, for example, when the fiber-optic cable 1 is bitten by animals.

Figure 5:
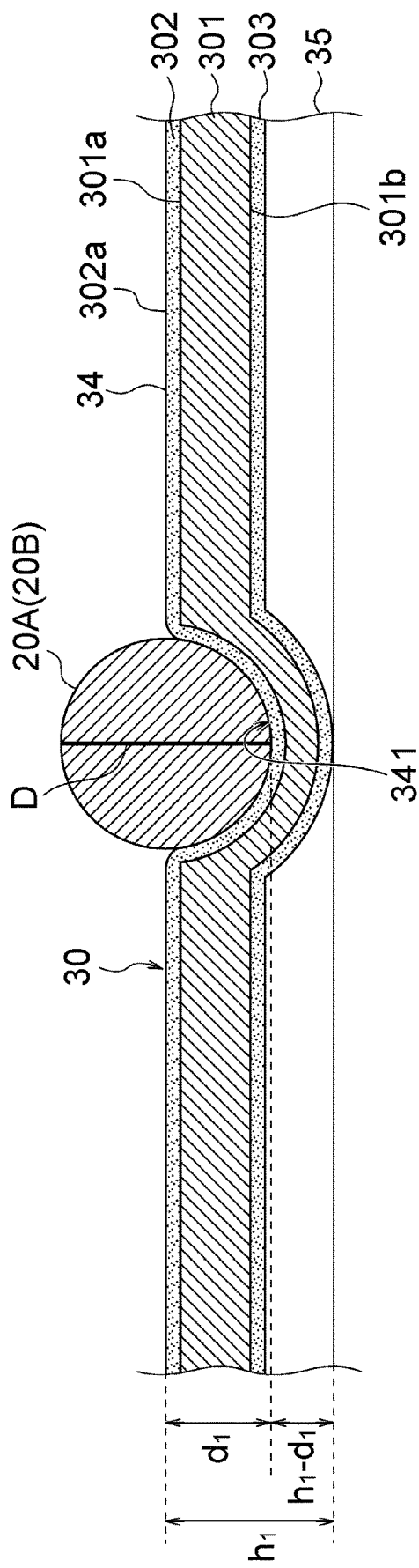
FIG. 5 is a cross-sectional view taken along the line V-V of FIG. 4B.

As shown in the cross-sectional view of FIG. 5, the protection layer 30 comprises a reinforcing sheet 301, a resin film 302 which is bonded to the inner peripheral surface 301a of the reinforcing sheet 301, a resin film 303 which is bonded to the outer peripheral surface 301b of the reinforcing sheet 301. As the reinforcing sheet 301, for example, a metal sheet, a fiber sheet, or a fiber-reinforced plastic (FRP) sheet or the like can be used. As the material constituting the metal sheet, for example, stainless steel, copper, or a copper alloy or the like can be used. Further, as the material constituting the fiber sheet, glass fibers and aramid fibers or the like can be used. The thickness of the reinforcing sheet may be, for example, 0.1 mm to 0.3 mm. Further, for example, as the resin film 302, 303, a heat-melt type adhesive film or the like can be used. The thickness of the resin film may be, for example, 0.01 mm to 0.1 mm. Thus, the thickness of the protection layer 30 may be, for example, 0.12 mm to 0.5 mm. It is noted that the resin film 302 may be omitted from protection layer 30.

As shown in FIG. 1, the protection layer 30 is formed in a tubular shape by being wound around cable body 10 in longitudinal direction. A part of the protection layer 30 is bonded to the external sheath 40 by the resin film 303 provided on the outer peripheral surface 301b (thermally fused). The circumferential direction (the width direction) of the protection layer 30 is substantially coincident with the circumferential direction of the optical fiber cable 1. Further, the longitudinal direction of protection layer 30 substantially coincides with the axial direction of the optical fiber cable 1.

The first end 31 of the protection layer 30 overlaps the second end 32 of the protection layer 30 in the radial direction of the optical fiber cable 1, thereby an overlapping portion 33 of the protection layer 30 is formed. In this overlapping portion 33, the resin films 302, 303 are bonded to each other (thermally fused).

The overlapping portion 33 overlaps the tensile strength members 50A, 50B in the radial direction of the fiber-optic cable 1. On the other hand, the overlapping portion 33 does not overlap with the ripcords 20A, 20B. Thus, in one or more embodiments, since the overlapping portion 33 does not overlap with the ripcords 20A, 20B, it is possible to further improve the tearing workability.

As shown in FIG. 4A, the protection layer 30 comprises peaks 34 and valleys 35. The peaks 34 protrude toward the central $C_1$ of the cable body 10 (refer to FIG. 1), and has an annular shape along the circumferential direction of the cable body 10. On the other hand, valleys 35 are recessed in a direction away from the central $C_1$ of the cable body 10 (refer to FIG. 1), and has an annular shape along the circumferential direction of the cable body 10. In one or more embodiments, the corrugated shape is formed by the peaks 34 and the valleys 35 are arranged alternately in the longitudinal direction. Since the protection layer 30 has the corrugated shape, the protection layer has flexibility.

On the inner peripheral surface (the inner surface) 302a of the protection layer 30, grooves 36 having a linear shape and extending along the longitudinal direction of the optical fiber cable 1 is formed. As shown in FIG. 1, in one or more embodiments, in accordance with the number of the ripcords 20A, 20B, a plurality of (two in one or more embodiments) grooves 36 are formed on the inner peripheral surface 302a of the protection layer 30. As shown in FIG. 4A, the groove 36 comprises recesses 341 formed by recessing a part of the peaks 34, the recesses 341 are aligned in a row along the longitudinal direction of the protection layer 30.

As shown in FIG. 4B, the ripcords 20A (20B) is disposed in the recesses 341 of the groove 36. As shown in FIG. 5, the recesses 341 are a wide enough that at least a part of the ripcords 20A (20B) are housed therein. Thus, the recess 341 suppresses the movement of the ripcord 20A (20B) in the circumferential direction. The recess 341 is formed by recessing a part of the peak 34 away from the central $C_1$ of the cable body 10 (refer to FIG. 1). Further, in one or more embodiments, the recess 341 is recessed in an arc shape in accordance with the outer peripheral shape of the ripcord 20A (20B).

The height $h_1$ of the peak 34 of the protection layer 30 is not particularly limited, in view of the flexibility and the like of the optical fiber cable 1, it is preferable to 0.1 mm to 0.6 mm (0.1 mm≤$h_1$≤0.6 mm). Here, the height $h_1$ refers to the distance from the bottom of the valley 35 to the vertex of the peak 34.

The depth $d_1$ of the recess 341 is not particularly limited, it is preferable to 0.10 mm to 0.34 mm (0.10 mm≤$d_1$≤0.34 mm). By setting the depth $d_1$ of the recess 341 within this range, the movement of the ripcord 20A (20B) can be restrained more reliably.

The ratio ($d_1$/D) of the depth $d_1$ of the recess 341 to the dimension D of the ripcord 20A (20B) is more preferably ⅙ or more ($d_1$/D≥⅙), more preferably ½ or more ($d_1$/D≥½), particularly preferably ⅔ or more ($d_1$/D≥⅔). It is possible to further suppress the movement of the ripcord 20A (20B) in the circle, since the ratio of the recess 341 depth $d_1$ to the dimension D ($d_1$/D) is within any of the above ranges.

The above corrugated shaped protection layer 30 having the recess 341, for example, can be manufactured by roll forming. Specifically, in the processing roll, it can be manufactured by lowering the height of the peak of the portion corresponding to the recess 341.

In one or more embodiments, the recess 341 is formed in all of the peaks 34, the recesses 341 are continuously aligned in the longitudinal direction, but is not particularly limited thereto.

The recess 341 may be restrain to move the ripcord 20A (20B) and may need not be formed in all the peak 34. For example, the recesses 341 may be arranged intermittently in the longitudinal direction by recess 341 is formed only in a part of the peak 34. In this case, the groove 36 comprising at least one recess 341 will be intermittently aligned along the longitudinal direction. When the optical fiber cable 1 cut at a predetermined length is used, the distance between the recesses 341 can be set according to the length of the optical fiber cable after cutting. In this case, the interval between the recesses 341 may be set so that the recesses 341 are included in the optical fiber cable after cutting.

In one or more embodiments, the peaks 34 are formed independently each other, the valleys 35 are also formed independently each other, but is not limited thereto. For example, the peaks 34 may have interconnected spiral shapes, similarly, the valleys 35 may have interconnected spiral shapes.

Further, the protection layer 30 may not have a corrugated shape. For example, the protection layer 30 may have a tubular shape whose main surface is flat. Also in this case, a part of the protection layer is recessed, thereby the grooves extending along the longitudinal direction can be formed on the inner surface of the protection layer.

As shown in FIG. 1, the external sheath 40 is a tubular member located outside the inner sheath 18 of the cable body 10, a gap 41 is formed between the inner sheath 18 and the external sheath 40. The cable body 10, protection layer 30, and the ripcords 20A, 20B are accommodated in an inner space formed inside the external sheath 40. This external sheath 40 is not particularly limited, but is made of a material similar to that of the inner sheath 18

Inside the external sheath 40, a plurality of (four in this example) tensile strength members (tension members) 50A to 50D are buried. The tensile strength members 50A to 50D are linear members extending in the longitudinal direction (refer to FIG. 3), the strain and bending applied to the optical fibers 14 by shrinkage of the external sheath 40 are restrained. Incidentally, the tensile strength member may be omitted from the external sheath 40.

The pair of the tensile strength members 50A, 50B faces each other across the cable body 10, and is arranged so as to be line-symmetrical with respect to the first straight line $L_1$. On the other hand, the pair of the tensile strength members 50C, 50D is opposed across the cable body 10, and is arranged so as to be line-symmetrical with respect to the second straight line $L_2$. Incidentally, the angle $\theta_1$ between the first straight line $L_1$ and the second straight line $L_2$ means the smaller angle of the angles between the first straight line $L_1$ and the second straight line $L_2$, the angle $\theta_1$ is 180° or less ($\theta_1 \leq 180°$).

Further, the tensile strength member 50A is adjacent to the tensile strength member 50C along the circumferential direction of the external sheath 40, is arranged so as to be line-symmetrical with the tensile strength member 50C with respect to the third straight line $L_3$. Similarly, the tensile strength member 50B is adjacent to the tensile strength member 50D along the circumferential direction of the external sheath 40, and is arranged to be line-symmetrical with the tensile strength member 50D with respect to the third linear $L_3$.

As a material constituting the tensile strength members 50A to 50D, a non-metallic material or a metallic material can be exemplified. Specific examples of the non-metallic material are not particularly limited, and glass fiber reinforced plastic (GFRP), aramid fiber reinforced plastic (KFRP) reinforced by Kevlar®, polyethylene fiber reinforced plastic reinforced by polyethylene fibers, or fiber reinforced plastic (FRP) such as carbon fiber reinforced plastic (CFRP) reinforced by carbon fibers can be used. Specific examples of the metallic material, but is not particularly limited, for example, a metal wire such as a steel wire can be used.

Conventionally, when the external sheath is torn, the ripcords are moved in the circumferential direction, there is a case where workability is deteriorated. Conventionally, the ripcords also move in the manufacturing process of the optical fiber cable. Thereby, readjustment of the position of the ripcords is required, workability is deteriorated. In contrast, in one or more embodiments, since the protection layer 30 has grooves 36 and the ripcords 20A, 20B are disposed in grooves 36, it is possible to increase the contact area between the ripcords 20A, 20B and the protection layer 30. Therefore, the movement of the ripcords 20A, 20B in the circumferential direction is restrained, workability is improved.

Further, conventionally, when the optical fiber cable is short (for example, 10 m or less), since the pull-out force of the ripcord is weak, if not fixed at one end of the ripcords during the tearing operation, the ripcords may be pulled out from the optical fiber cable. In contrast, according to the optical fiber cable 1 of one or more embodiments, since the contact area between the protection layer 30 and the ripcords 20A, 20B are larger than the conventional, it is possible to increase the pull-out force of the ripcords 20A, 20B, the ripcords 20A, 20B are difficult to pull out from the optical fiber cable.

In one or more embodiments, as shown in FIG. 1, the angle $\theta_1$ between the first straight line $L_1$ and the second straight line $L_2$ is 180°. The first straight line $L_1$ is a straight line passing through the center $C_1$ of the cable body and the center $C_2$ of the first ripcord 20A, and the second straight line $L_2$ is a straight line passing through the center $C_1$ of the cable body and the center $C_3$ of the second ripcord 20B.

The above angle $\theta_1$ is not particularly limited, but is preferably 120° or more ($\theta_1 \geq 120°$). The pair of the ripcords 20A, 20B are separated each other more than a certain distance in the circumferential direction of the optical fiber cable 1. Thus, since the width of the open portion of the protection layer 30 and the external sheath 40 is increased, it is possible to improve the taken-out workability of the cable body 10.

Here, the optical fiber cables having $\theta_1$ in the range shown in Table 1 below were produced, and the taken-out workability was evaluated. That is, the tearing protection layer 30 and the external sheath 40 was torn with a pair of the ripcords, and the cable body was taken out from the optical fiber cable. In this test, the taken-out workability of the cable body was evaluated in ○ or ×. "○" means that workability was good. "×" means that cable body could not be taken out. The results are given in Table 1.

TABLE 1

| $\theta_1$ [°] | Taken-out Workability |
| --- | --- |
| 30 | X |
| 60 | X |
| 90 | X |
| 120 | ○ |
| 150 | ○ |
| 180 | ○ |

From Table 1, by setting $\theta_1$ to 120° or more, it can be seen that the removal workability is good. The scope of this $\theta_1$ can also be applied in the second example described later.

The first end 33a of overlapping portion 33 preferably spaced from the ripcord 20A in the circumferential direction of the optical fiber cable 1, more specifically, the angle $\theta_2$ between the third straight line $L_3$ and the fourth straight line $L_4$ is preferably 70° or less ($\theta_2 \leq 70°$). When $\theta_2$ is 70° or less ($\theta_2 \leq 70°$), it is possible to further improve the tear workability.

The third straight line $L_3$ is a neutral line defined by tensile strength members 50A to 50D, and the fourth straight line $L_4$ is a straight line passing through the center $C_1$ of the cable body 10 and the first end 33a of the overlapping portion 33. The neutral line, more specifically, in the transverse cross section of the optical fiber cable 1 is a straight line extending along the neutral plane. The neutral plane is a plane where elongation and shrinkage do not occur when the optical fiber cable 1 is bent in a direction substantially perpendicular to the opposing direction of the tensile strength members 50A to 50D.

In one or more embodiments, the neutral line is a straight line passing through the center point $M_1$ between the center $C_4$ of the tensile strength member 50A and the center $C_5$ of the tensile strength member 50C, and the center point $M_2$ between the center $C_6$ of tensile strength member 50B and the center $C_7$ of the tensile strength member 50D. In one or more embodiments, a neutral line is defined by two pairs of the tensile strength member 50A to 50D, but is not limited thereto. For example, if only a pair of the tensile strength members opposing each other across the cable body 10 is provided in the external sheath 40, a straight line passing through the center of each tensile strength member becomes a neutral line.

Here, the optical fiber cables having $\theta_2$ in the range shown in Table 2 below were produced, and the tearing workability was evaluated. In this test, the tearing workability of cable body was evaluated in ◉, ○, Δ, or ×. "◉" means good workability. "○" means that there was no problem in workability. "Δ" means that the workability became somewhat worse due to the time-consuming operation of tearing. "×" means that tearing could not be done. Table 2 shows the results.

TABLE 2

| $\theta_2$ [°] | Tearing Workability |
|---|---|
| 10 | ◉ |
| 30 | ◉ |
| 50 | ◉ |
| 70 | ○ |
| 80 | Δ |
| 90 | Δ |
| 100 | X |

As shown in table 2, in the case the angle $\theta_2$ between the third straight line $L_3$ and the fourth straight line $L_4$ is 70° or less, there is no problem in tear workability. In particular, in the case the angle $\theta_2$ is 50° or less, tear workability was good. The range of the angle $\theta_2$ can also be applied in the second example described later.

Similarly to the first end 33a, the second end 33b of the overlapping portion 33 is also preferably spaced from the ripcord 20B in the circumferential direction of the optical fiber cable 1, more specifically, the angle $\theta_3$ between the fifth straight line $L_5$ and the fourth straight linear $L_4$ is preferably 70° or less ($\theta_3 \leq 70°$). Here, the fifth straight line $L_5$ is a straight line passing through the center $C_1$ of the cable body 10 and the second end 33b of the overlapping portion 33. In one or more embodiments, $\theta_2$ is larger than $\theta_3$ ($\theta_2 > \theta_3$). The range of the angle $\theta_3$ can also be applied in the second example described later.

Second Example

Figure 6:
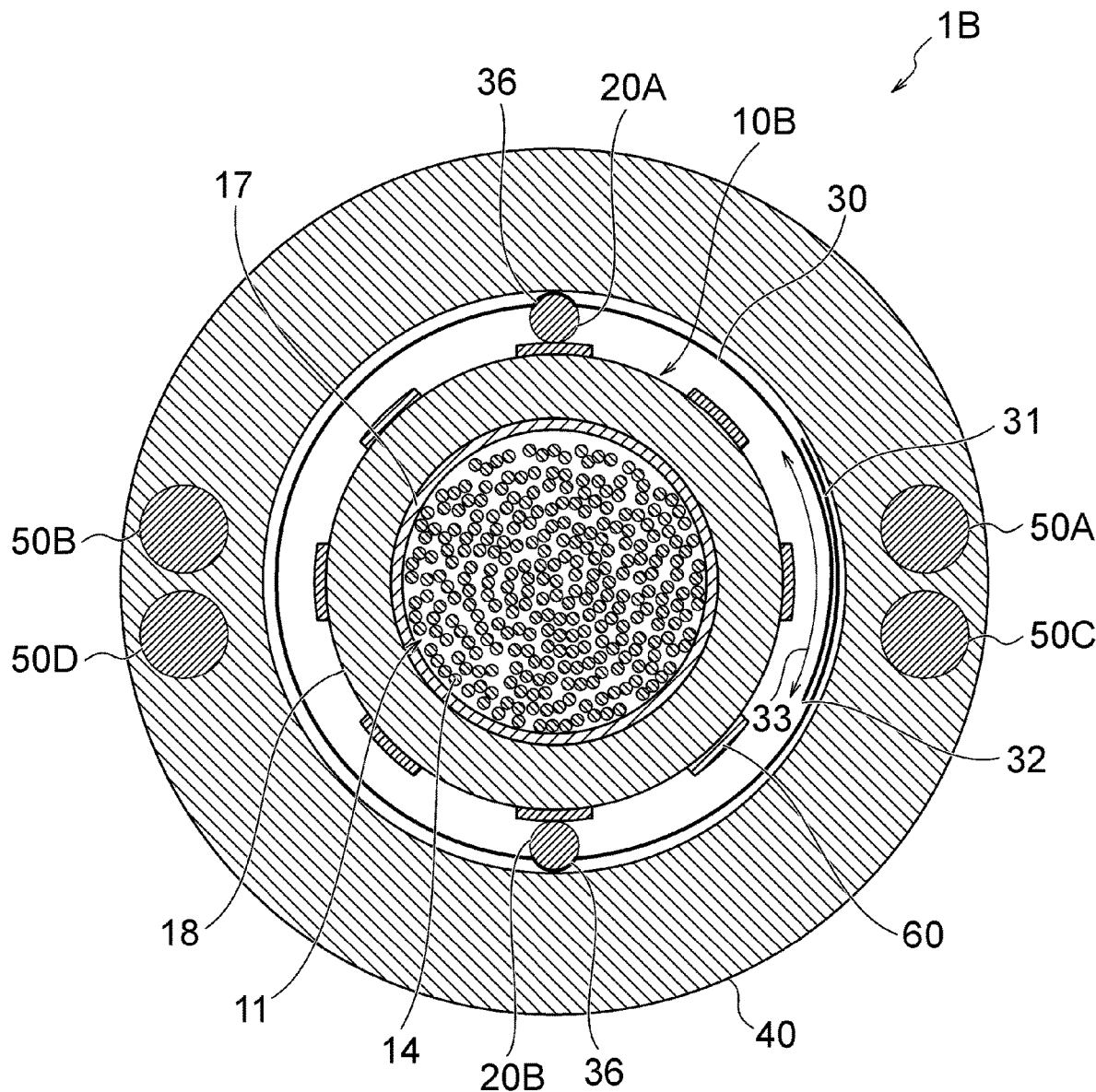
FIG. 6 is a cross-sectional view showing an optical fiber cable in one or more embodiments.

FIG. 6 is a cross-sectional view showing an optical fiber cable in one or more embodiments. In the second example, the cable body 10B is different from the first example in that the cable body 10B further includes an inclusion 60, but other configurations are the same as those of the first example. Hereinafter, only the inclusion 60 in the second example be described, and the same reference numerals are given to the same components as those in the first example, and description thereof will be omitted.

In the optical fiber cable 1B, the inclusion 60 is, for example, a fiber sheet having a tape shape extending longitudinally. In one or more embodiments, a plurality (eight in one or more embodiments) of inclusions 60 are disposed on the outer periphery of the inner sheath 18 of the cable body 10B. The inclusion 60 may be the longitudinally lapped, or it may be twisted by SZ twist or unidirectional twist. The material constituting the inclusion 60 is not particularly limited, but glass fibers, aramid fibers, carbon fibers, metal fibers, and the like can be used.

Thus, it is possible to improve the tensile force of the cable body 10 by disposing the inclusions 60 around the cable body 10. Thus, since the diameter of the tensile strength members 50A to 50D can be reduced, it is possible to reduce the diameter and weight of the optical fiber cable 1B.

Incidentally, it may be imparted with waterproofness to the inclusion 60. Further, although not shown in particular, it may be used a press-wrapping tape in place of the inclusions. Further, it may be provided with a press-wrapping tape on the outside of the inclusion 60. As the press-wrapping tape, it is possible to use the same as the press-wrapping tape 17. Further, it may be imparted with waterproofness to the press-wrapping tape. Further, an inclusion having a water absorbing property such as water absorbing yarn may be disposed between the inclusions 60.

Also in one or more embodiments, as in the first example, since the ripcords 20A, 20B are disposed on grooves 36 of the protection layer 30, the contact areas between the protection layer 30 and the ripcords 20A, 20B can be increased. Therefore, the movement of the ripcords 20A, 20B in the circumferential direction can be restrained, it is possible to improve the workability.

Third Example

Figure 7:
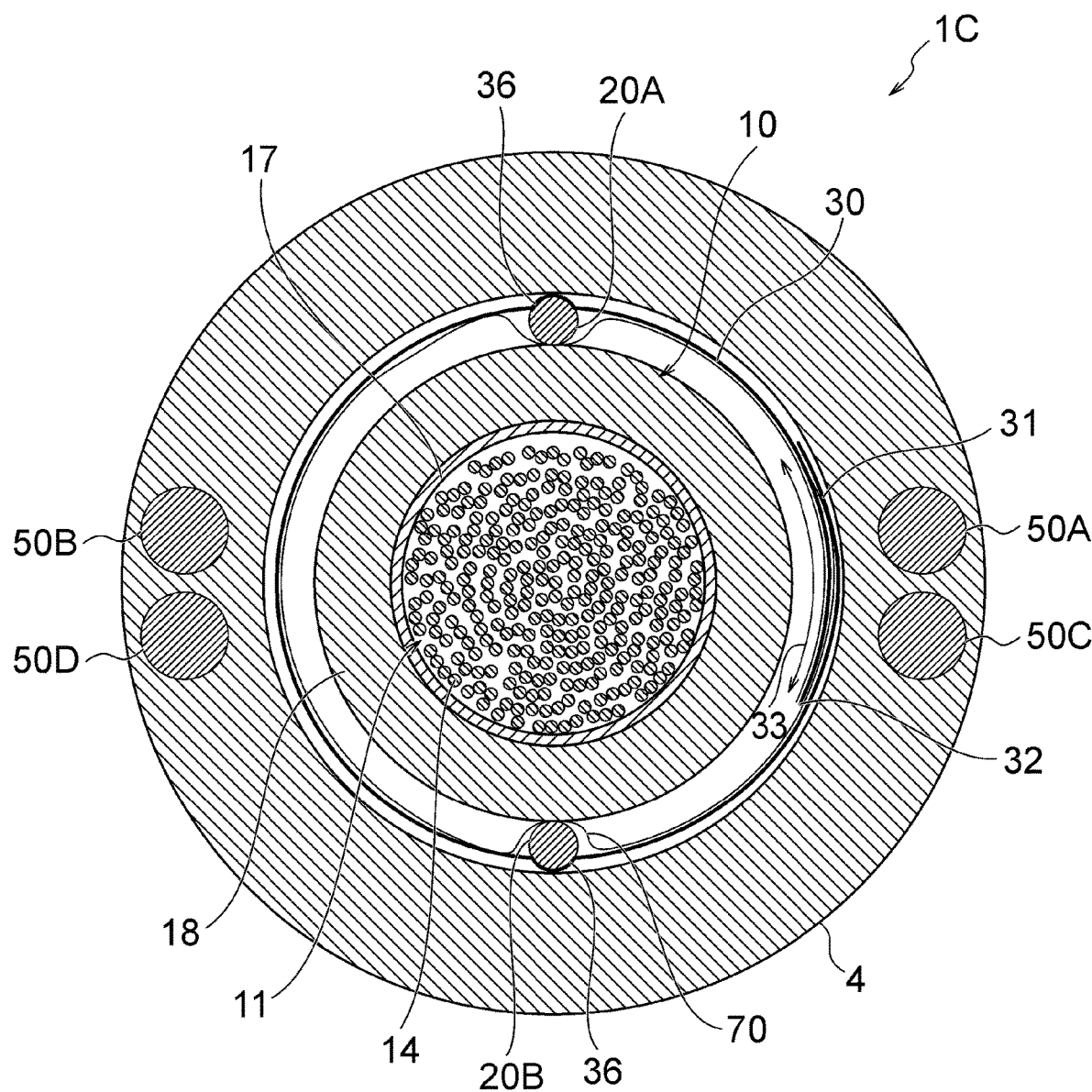
FIG. 7 is a cross-sectional view showing an optical fiber cable in one or more embodiments.
Figure 8:
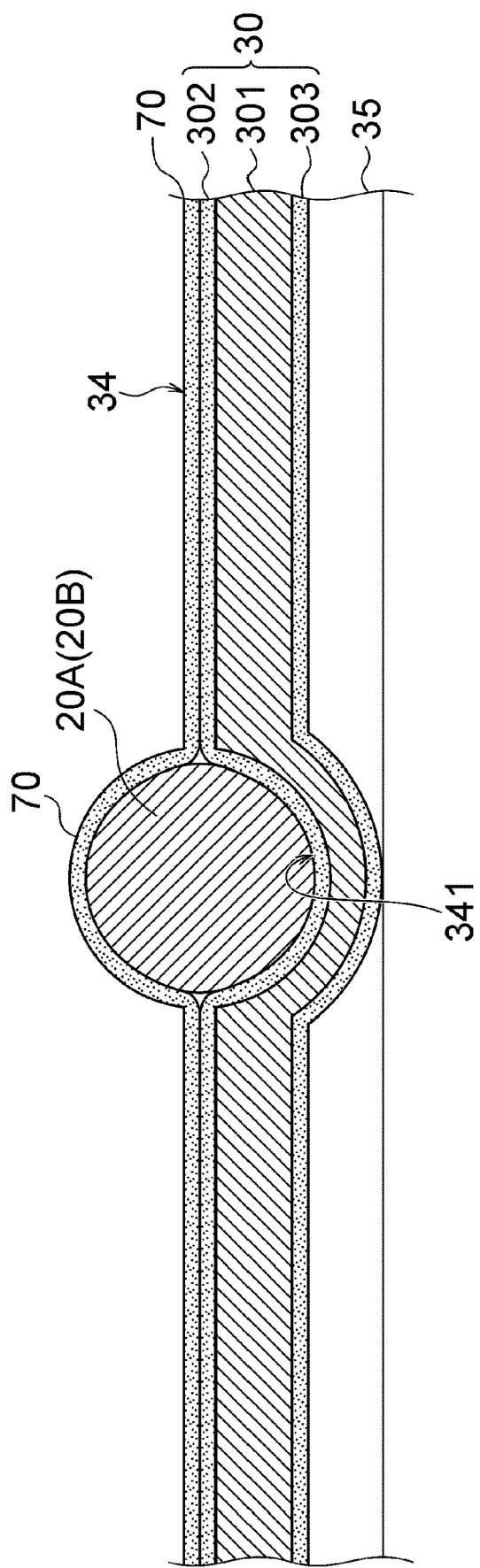
FIG. 8 is a cross-sectional view of a state in which ripcords are disposed in recesses of a protection layer in one or more embodiments, is a diagram corresponding to a cross-sectional view taken along the line V-V of FIG. 4B.

FIG. 7 is a cross-sectional view showing an optical fiber cable in one or more embodiments, FIG. 8 is a cross-sectional view of a state in which ripcords are disposed in recesses of the protection layer in one or more embodiments, is a diagram corresponding to a cross-sectional view taken along the line V-V of FIG. 4B.

In the third example, the optical fiber cable 1C is different from the first example in that the optical fiber cable 1C further includes a resin film 70, other configurations are the same as those of the first example. Hereinafter, only the resin film 70 in the third example be described, and the same reference numerals are given to the same components as those in the first example, and description thereof will be omitted.

As shown in FIGS. 7 and 8, the optical fiber cable 1C of one or more embodiments further comprises a tubular resin film 70 on the innermost periphery of the protection layer 30C. As shown in FIG. 8, this resin film 70 is stuck on the resin film 302 of the protection layer 30C. The resin film 70 covers the ripcords 20A, 20B, the areas corresponding to the ripcords 20A, 20B are curved along the outer periphery of the ripcords 20A, 20B. Thus, the ripcords 20A, 20B are disposed between the resin film 70 and the grooves 36. Similarly to the resin films 302, 303, the resin film 70 is made of a heat-melt type adhesive film or the like. This resin film 70 is bonded to the resin film 302

In one or more embodiments, it is possible to further restrain the movement of the ripcords 20A, 20B in the circumferential direction by fixing the ripcords 20A, 20B to the grooves 36 with the resin film 70. Therefore, it is possible to further improve the workability.

In one or more embodiments, the resin film 70 is disposed on the entire inner periphery of the protection layer, but is not limited thereto. The resin film 70 may be disposed only on a part of an inner periphery of the protection layer 30 Specifically, for example, the resin film 70 may cover the ripcords 20A, 20B, may be attached only to a portion located in the vicinity of the ripcords 20A, 20B of the protection layer 30.

Embodiments heretofore explained are described to facilitate understanding of the present invention and are not described to limit the present invention. It is therefore intended that the elements disclosed in the above embodiments include all design changes and equivalents to fall within the technical scope of the present invention.

REFERENCE SIGNS LIST 1, 1B, 1C . . . Optical fiber cable
10, 10B . . . Cable body
11 . . . Optical fiber assembly
  12 . . . Optical fiber unit
    13 . . . Optical fiber ribbon
      14 . . . Optical fiber
      15 . . . Adhesive portion
  16 . . . Bundle material
17 . . . Press-wrapping tape
18 . . . Inner sheath
20A, 20B . . . Ripcords
30 . . . Protection layer
  301 . . . Reinforcing sheet
    301a . . . Inner peripheral surface
    301b . . . Outer peripheral surface
  302, 303 . . . Resin film
    302a . . . Inner peripheral surface
  31 . . . First end
  32 . . . Second end
  33 . . . Overlapping portion
    33a . . . First end
    33b . . . Second end
  34 . . . Peak
    341 . . . Recess
  35 . . . Valley
  36 . . . Groove
40 . . . External sheath
41 . . . Gap
50A to 50D . . . Tensile strength member
60 . . . Inclusion
70 . . . Resin film
$L_1$ to $L_5$ . . . First to fifth lines

The invention claimed is:

1. An optical fiber cable comprising:
a cable body that includes an optical fiber;
an external sheath that accommodates the cable body;
a protective layer that is disposed between the cable body and the external sheath and that includes a first groove on an inner circumferential surface of the protective layer, wherein the first groove extends along an axial direction of the cable body; and
a first ripcord disposed in the first groove and between the cable body and the protective layer, wherein
the protective layer has a corrugated shape that includes alternating peaks and valleys along the axial direction,
the first groove includes recesses along the axial direction in a portion of the peaks, and
the first ripcord is disposed in the recesses.

2. The optical fiber cable according to claim 1, further comprising:
a second ripcord; and
a second groove, wherein
the second ripcord is disposed in the second groove.

3. The optical fiber cable according to claim 2, wherein
the optical fiber cable satisfies a formula of $\theta 1 \geq 120°$, where $\theta 1$ is an angle between a first straight line and a second straight line of the optical fiber cable,
the first straight line passes through a center of the cable body and a center of the first ripcord, and
the second straight line passes through the center of the cable body and a center of the second ripcord.

4. The optical fiber cable according to claim 3, further comprising:
a pair of tensile strength members disposed in the external sheath and facing each other across the cable body, wherein
the protective layer includes an overlapping portion where one end of the protective layer overlaps the other end of the protective layer in a circumferential direction of the cable body,
the optical fiber cable satisfies a formula of $\theta 2 \leq 70°$ where $\theta 2$ is the larger of an angle between a third straight line and a fourth straight line of the optical fiber cable and an angle between the third straight line and a fifth straight line of the optical fiber cable,
the third straight line is defined by the tensile strength members,
the fourth straight line passes through a center of the cable body and a first end of the overlapping portion, and
the fifth straight line passes through the center of the cable body and a second end of the overlapping portion.

5. The optical fiber cable according to claim 1, further comprising;
a film attached to an inner surface of the protective layer to cover the first ripcord, wherein
the first ripcord is disposed between the film and the first groove.

6. The optical fiber cable according to claim 1, wherein the optical cable satisfies a formula of $d1/D \geq \frac{1}{2}$, where d1 is a depth of the first groove, and D is a diameter of the first ripcord.

7. The optical fiber cable according to claim 1, wherein the protective layer has a tubular shape around the cable body.

* * * * *